(12) United States Patent
Karjalainen (10) Patent No.: US 7,313,114 B2
(45) Date of Patent: Dec. 25, 2007

(54) SELECTING SPREADING CODE IN SPREAD SPECTRUM SYSTEM

(75) Inventor: Miia Karjalainen, Oulu (FI)

(73) Assignee: Nokia Corporation, Espoo (FI)

( * ) Notice: Subject to any disclaimer, the term of this patent is extended or adjusted under 35 U.S.C. 154(b) by 932 days.

(21) Appl. No.: 10/137,700

(22) Filed: May 3, 2002

(65) Prior Publication Data

US 2002/0176438 A1 Nov. 28, 2002

(30) Foreign Application Priority Data

May 4, 2001 (FI) .................................. 20010937

(51) Int. Cl.
*H04B 7/216* (2006.01)
(52) U.S. Cl. ...................... 370/335; 370/342; 370/441; 375/130
(58) Field of Classification Search ...................... None
See application file for complete search history.

(56) References Cited

U.S. PATENT DOCUMENTS

| | | | | | |
|---|---|---|---|---|---|
| 6,122,310 | A | * | 9/2000 | Ziemer et al. | 375/142 |
| 6,163,524 | A | | 12/2000 | Magnusson et al. | |
| 6,477,158 | B1 | * | 11/2002 | Take | 370/335 |
| 6,646,979 | B1 | * | 11/2003 | Chen et al. | 370/208 |
| 6,944,210 | B1 | * | 9/2005 | Michel et al. | 375/150 |
| 7,039,092 | B1 | * | 5/2006 | Cao et al. | 375/140 |
| 2002/0037015 | A1 | * | 3/2002 | Shanbhag | 370/441 |

FOREIGN PATENT DOCUMENTS

EP 0 944 198 9/1999

OTHER PUBLICATIONS

Thit Minn, Kai-Yeung Siu: "Dynamic Assignment of Orthogonal Variable-Spreding-Factor Codes in W-CDMA", IEEE Journal on Selected Areas in Communications, Aug. 2000, IEEE, USA, vol. 18, nr. 8, pp. 1429-1440, ISSN 0733-8716.

Ray-Guang Cheng, Phone Lin: "OVSF Code Channel Assignment for IMT-2000", IEEE 51st Vehicular Technology Conference Proceedings, VTC2000, Tokyo, Japan, May 15-18, 2000, pp. 2188-2192, vol., 3, ISBN 0-7803-5718-3.

Lih-feng Tsaur, Lee D.C.: Symbol Rate Adaptation and Blind Rate Detection Using FOSSIL (Forest for OVSF-Sequence-Set-Inducing Lineages), Proceedings of IEEE International Conference on Communications, Helsinki, Finland, Jun. 11-14, 2001, pp. 1754-1759, vol. 6, ISBN 0-7803-7097-1.

(Continued)

*Primary Examiner*—Duc Ho
(74) *Attorney, Agent, or Firm*—Pillsbury Winthrop Shaw Pittman LLP; Larry J. Hume (57) ABSTRACT

The invention relates to a base transceiver station in a CDMA mobile telephone system, including a mechanism for maintaining a code tree which determines spreading codes to be used in the system, a mechanisms for selecting a spreading code from the code tree for the communication between the base transceiver station and terminal equipment communicating with the base transceiver station. The mechanisms for selecting a spreading code are configured to select a highest level in the code tree which includes at least one branch of the code tree whose spreading codes are allocatable, and allocate for use a spreading code generated from a branch of the selected level whose spreading codes are allocatable. The invention further relates to a method and a communication system in connection with Code Division Multiple Access (CDMA) technology.

20 Claims, 5 Drawing Sheets

OTHER PUBLICATIONS

Finnish Office Action dated Feb. 8, 2002.
Thit Minn, Kai-Yeung Siu: "Dynamic Assignment of Orthogonal Variable-Spreding-Factor Codes in W-CDMA", IEEE Journal on Selected Areas in Communications, Aug. 2000, IEEE, USA, vol. 18, nr. 8, pp. 1429-1440, ISSN 0733-8716.
Ray-Guang Cheng, Phone Lin: "OVSF Code Channel Assignment for IMT-2000", IEEE 51st Vehicular Technology Conference Proceedings, VTC2000, Tokyo, Japan, May 15-18, 2000, pp. 2188-2192, vol. 3, ISBN 0-7803-5718-3.
Lih-teng Tsuar, Lee D.C.: Symbol Rate Adaptation and Blind Rate Detection Using FOSSIL (Forest for OVSF-Sequence-Set-Inducing Lineages), Proceedings of IEEE International Conference on Communications, Helsinki, Finland, Jun. 11-14, 2001, pp. 1754-1759, vol. 6, ISBN 0-7803-7097-1.
Finnish Office Action dated Feb. 8, 2002.

* cited by examiner

SELECTING SPREADING CODE IN SPREAD SPECTRUM SYSTEM

FIELD OF THE INVENTION

The invention relates to mobile communication systems, and particularly to systems using a spread spectrum method, wherein users' information contents are separated from each other on the basis of spreading codes to be allocated to the users.

BACKGROUND OF THE INVENTION

In digital mobile communication systems using a CDMA (Code Division Multiple Access) method, users are separated on the basis of spreading codes. At a base transceiver station, symbols to be transmitted to a user are multiplied by a spreading code, which determines a spreading factor. Spreading codes are selected e.g. from a code tree determining the codes, wherein the spreading codes are mutually orthogonal in order to minimize cross-correlation between codes. A code can be constructed e.g. such that the highest level, where the spreading code is one, is only provided with one code, which branches out into two mutually orthogonal codes on a lower, i.e. second, level. The two second-level codes thus generated are identical as far as the first half of the code is concerned, but the second halves of the codes differ from each other in being mutually orthogonal. Each of the second-level codes is further branched into two new codes on a lower level, all codes on a same level being mutually orthogonal. The codes are also orthogonal with codes on different levels of the code tree as seen from the point of view of spreading, i.e. codes can be allocated from the same tree to users using different transmission rates. Spreading codes are often allocated from the same spreading code tree to users in a particular system, and interference between different base transceiver stations is prevented by means of scrambling codes determining the base transceiver stations. All spreading codes provided by the code tree are thus available to the base transceiver station or even to a particular transmission sector. User signals generated by means of the spreading codes are combined into a broadband combination signal, which enables the available restricted radio resources to be utilized efficiently.

The combination signal generated by combining user signals includes occasional power peaks that interfere with the operation of the system. Furthermore, the implementation of an amplifier which produces a power peak is not very cost-effective in practice, so the combination signal is often subjected to clipping wherein power peaks exceeding a given threshold value are clipped off from the signal. A drawback to clipping is that the signal becomes more difficult to receive because the separating capability provided by the orthogonality of the users' spreading codes decreases.

In mobile communication networks, such as in the known UMTS (Universal Mobile Telephony System) system, the spreading codes can be selected for users from several different levels when the spreading factor ranges between 4 and 512 such that spreading codes for users in need of lower transmission rates are allocated from higher spreading factor levels. In prior art solutions, on a certain spreading factor level, such as on level 256, spreading codes are selected in an order starting e.g. from the first code in order.

Since the spreading codes are selected from the code tree in such an order that a new code to be selected is often a code adjacent to the code previously selected, the codes selected for use often include codes whose first parts are congruent with those of the codes already being used. When the spreading codes in use have a large portion in common, it becomes more difficult to identify user information in a combination signal. Such a set of codes wherein the codes are selected in a particular order is particularly weak when clipping is performed on a part of a signal wherein the codes differ from each other and congruent parts remain. It is thus obvious that a need exists to provide a method and an apparatus for selecting spreading codes such that the capacity for separating user signals remains as high as possible, particularly when clipping a combination signal so as to eliminate power peaks.

BRIEF DESCRIPTION OF THE INVENTION

An object of the invention is thus to provide an improved method and an apparatus implementing the method so as to enable available spreading codes to be optimally protected against clipping of power peaks. This is achieved by a method for selecting a spreading code in a spread spectrum system, wherein spreading codes are allocated to terminal equipment from a code tree which includes hierarchical levels, in which code tree spreading codes according to a certain spreading factor are located on the same level, the levels being arranged such that the level of the lowest spreading factor is located highest in the tree and the rest of the levels are located below the highest level in an order according to the spreading factor, from the lowest to the highest. The method comprises, when allocating a new spreading code, searching the code tree for a highest level of the code tree which includes at least one branch of the code tree, spreading codes in hierarchical relation to the branch being allocatable, and allocating for use a spreading code related to the branch of the sought level.

The invention further relates to a communication system using a code division multiple access method, comprising a base transceiver station and terminal equipment communicating with the base transceiver station, means for maintaining a code tree which includes a hierarchically branching structure where a spreading code on a higher level of the code tree is related to two spreading codes on a lower level, symbols of the first half of the spreading codes on the lower level being congruent with those of the spreading code on the higher level, and means for-selecting a spreading code from the code tree for the use of the terminal equipment for transmission from the base transceiver station to the terminal equipment. The means for selecting a spreading code are configured to search the code tree for a highest level which includes at least one branch of the code tree, spreading codes in subordinate relation to the branch being allocatable, and allocate a spreading code related to the branch of the sought level for the use of the terminal equipment.

The invention further relates to a base transceiver station in a CDMA mobile telephone system, comprising means for maintaining a code tree which determines spreading codes to be used in the system, in which code tree spreading codes according to a certain spreading factor are located on the same level, the levels being arranged such that the level of the lowest spreading factor is located highest in the tree and the rest of the levels are located below the highest level in an order according to the spreading factor, from the lowest to the highest, means for selecting a spreading code from the code tree for the communication between the base transceiver station and terminal equipment communicating with the base transceiver station. The means for selecting a spreading code are configured to select a highest level in the code tree which includes at least one branch of the code tree whose spreading codes are allocatable, and allocate for use a spreading code generated from a branch of the selected level whose spreading codes are allocatable.

Embodiments of the invention are disclosed in the dependent claims.

The invention thus relates to a method and an apparatus for selecting spreading codes in mobile communication systems using a code division multiple access method. The invention relates to downlink transmission wherein the mobile communication system selects spreading codes for users. The invention relates to mobile communication systems wherein spreading codes are selected from a hierarchical code tree in which a higher level code branch, i.e. a spreading code, branches into two codes downwards the tree. In the code tree, spreading codes according to a certain spreading factor are thus located on the same level, the levels being arranged such that the level of the lowest spreading factor is located highest in the tree and the rest of the levels are located below the highest level in an order according to the spreading factor, from the lowest to the highest. The codes determined by the code tree may be mutually orthogonal, being generated from a Hadamard matrix, for example. In such a case, a higher level code includes a certain set of symbols that constitute symbols in the first half of lower level codes, the orthogonality between the codes being achieved by means of differences in the second symbol half. Codes on different levels are thus also mutually orthogonal as far as spreading is concerned, although the codes differ in length.

Since two adjacent lower level codes generated from the same higher level code are congruent as far as the symbols in the first half are concerned, it is preferable to try to maximize the differences between the spreading codes in use. The inventive solution comprises selecting spreading codes for use from the code tree such that the spreading codes differ from each other as early as possible when the symbols of a spreading code are read from the beginning of the spreading code. Then, for example, if there is one user in a system and a second one is about to enter the system, a spreading code is selected for the second user from a different branch than that of the spreading code allocated to the first user already on the second level of the code tree.

In the solution of the invention, when allocating a new spreading code, a code tree is searched for a level which includes at least one branch whose spreading codes are allocatable. "Allocatability" herein means that a spreading code describing a level is unallocated, and no spreading code hierarchically subordinate to the spreading code describing the level is being used by terminal equipment, i.e. users, and no such spreading code is allocated for the use of control channels either. When selecting a new spreading code, such a branch is selected, and a spreading code from the particular branch is allocated for use.

In an embodiment of the invention, when allocating a new spreading code and selecting an allowed branch, a branch is selected such that the spreading code symbols of the branch differ from the symbols of the spreading codes of the branches being used as early as possible as seen from the beginning of the spreading code. In other words, when selecting a branch and a spreading code subordinate to the branch, the difference between the branches is further maximized as far as the symbols in the first part are concerned.

The invention provides a considerable advantage over the known solutions. Since the spreading codes in use are as different from each other as possible, user signal identification is improved considerably. The advantages are important in a practical mobile communication system in particular wherein a combination signal is subjected to clipping in order to eliminate power peaks.

BRIEF DESCRIPTION OF DRAWINGS

The invention is now described in closer detail in connection with some embodiments and with reference to the accompanying drawings, in which.

DETAILED DESCRIPTION OF THE INVENTION

Figure 1:
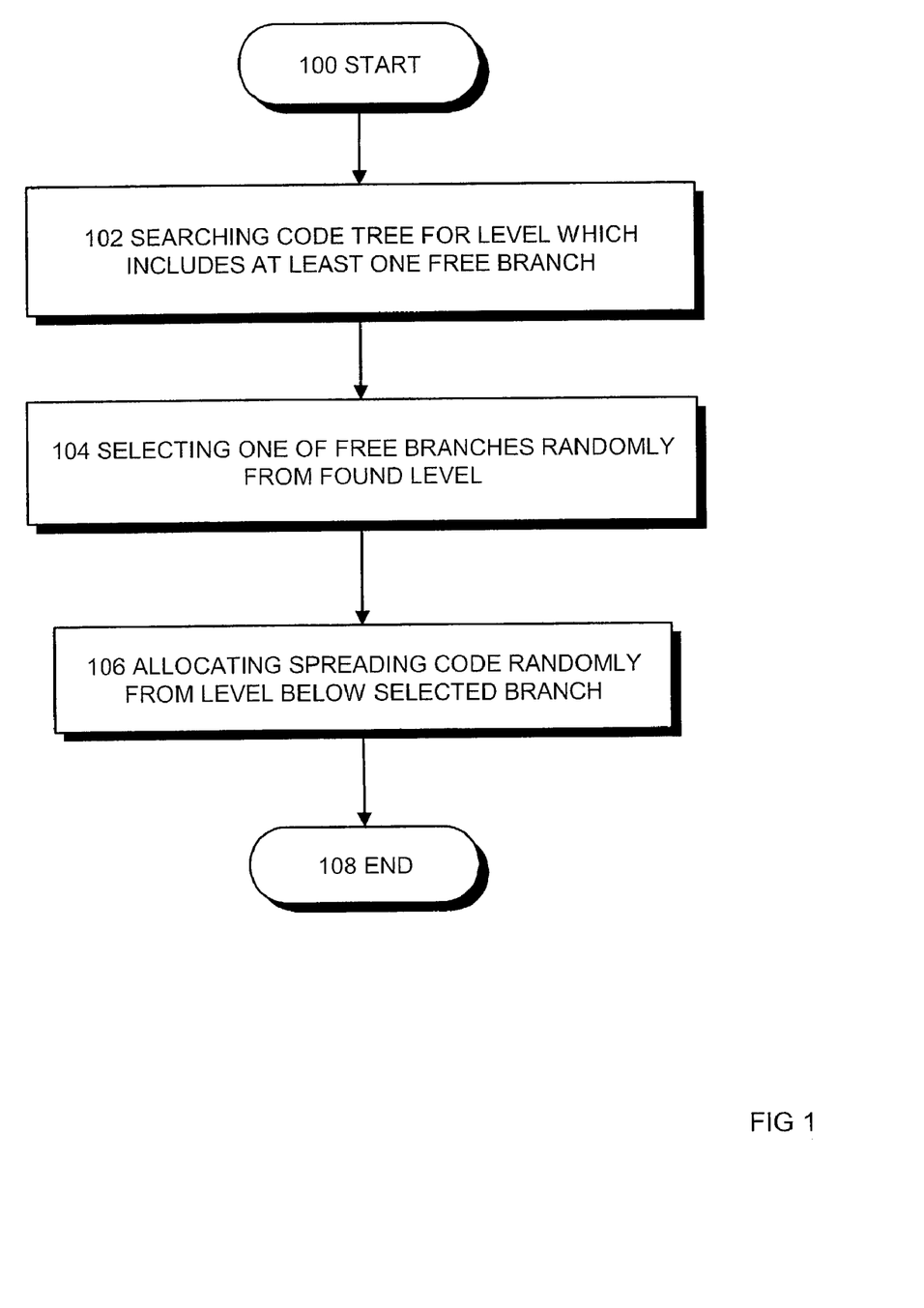
FIG. 1 shows an embodiment of a method in accordance with the invention.

Next, the invention will be described by means of some embodiments and with reference to the accompanying drawings. The description is based on a UMTS (Universal Mobile Telephony System) mobile communication system, but it is obvious that the UMTS is only used as an example in the description to exemplify a system according to the invention. A communication system and a mobile communication system of the invention refer to all systems applying a code division multiple access method. Examine first a method of the invention with reference to FIGS. 1 and 2. In method step 100 of FIG. 1, a spreading code is being selected for a user in a communication system implementing a code division multiple access method, such as a mobile communication system. The selection of the spreading code and the method of the invention relate to downlink transmission, and the method steps are carried out at a base transceiver station, a base station controller or at another such network element of the mobile communication system. The spreading code is selected for the user from a code tree; the structure of the code tree will be described in FIG. 2. The spreading code tree is constructed using OSVF (Orthogonal Variable Spreading Code) technology, which enables a spreading factor to be changed without impairing the orthogonality of the spreading codes. For example, the spreading code equivalent to a spreading factor one is (1), the length of the spreading code thus being one element, i.e. chip, of the spreading code. A spreading factor two is provided with two mutually orthogonal spreading codes (1,1) and (1,−1), and in these spreading codes the symbols in the first half, herein symbol (1) alone, are congruent with those of the higher level spreading code. Furthermore, a spreading code four (SF=4) is provided with four mutually orthogonal spreading codes: spreading codes (1,1,1,1) and (1,1,−1,−1) are located below the higher level spreading code (1,1), and spreading codes (1,−1,1,−1) and (1,−1,−1,1) are located below the second higher level spreading code (1,−1). If a spreading code of a particular level is designated by (c), the next level spreading codes will then be (c −c) and (c c). The designation (c −c) herein means that the higher level symbols are copied to constitute the first half of the code, and the negation of the first half is copied to constitute the second half. This is continued to generate further spreading codes as the process proceeds to lower levels of the code tree. The method disclosed herein for generating an orthogonal spreading code tree is not the only possible one but also other methods exist.

The spreading codes of a particular level are always mutually orthogonal. Similarly, as far as spreading is concerned, a spreading code of a particular level is orthogonal with all next level spreading codes derived from another spreading code of the same level. In a CDMA system, it is important that the cross-correlation between different spreading codes is as low as possible. This results in less multiple access interference (MAI), which enables one user to be better distinguished from among other users. An autocorrelation function of the spreading code should be as impulsive as possible, i.e. a high peak preferably occurs in the middle of the autocorrelation function, in which case sidebands are close to zero. This ensures reliable time resolution, which is important for synchronization. Good autocorrelation characteristics also ensure reliable separation of multipath components.

In transmission, each user symbol is multiplied by the spreading code to be used, whereby data are spread over the frequency band to be used. When, for example, a spreading factor 256 is used, one symbol is represented by 256 chips. Similarly, when a spreading code 16 is used, one symbol is represented by 16 chips. Typically, the maximum number of different mutually orthogonal spreading codes simultaneously used is 256 or 512. On a UMTS downlink, for example, when a 5 MHz carrier wave is used at a rate of 4.096 Mch/s, the spreading factor 256 corresponds with a 32 kb/s transmission rate; similarly, the highest practical transmission rate is achieved by a spreading factor 4, which means a 2048 kb/s data transfer rate. The transmission rate on a channel thus varies in a series of steps 32, 64, 128, 256, 512, 1024, and when the 2048 kbit/s spreading factor changes, in a series of steps 256, 128, 64, 32, 16, 8 and 4, correspondingly. The data transfer rate available for a user depends on the channel coding used. When, for example, ⅓ convolution coding is used, the user's data transfer rate is approximately ⅓ of the data transfer rate of the channel.

Let us return to FIG. 1 showing the method, and to method step 102 wherein a code tree is searched for a highest level which includes at least one free branch, i.e. the branch per se or a spreading code subordinate thereto is not allocated to a spreading code use. In an embodiment of the invention, when searching for such a level of the code tree, the process starts traversing the code tree level by level, starting from the highest one. This method is particularly advantageous when the system includes terminal equipment using different transmission rates. If a high-rate user enters the system and no spreading code is automatically found for the user on a desired level, the system may have to reallocate spreading codes to the users such that spreading codes subordinate to the spreading code to be allocated to the high-rate user become free. The spreading code to be allocated to the high-rate user is e.g. the highest branch of the code tree whose codes are allocatable. Control channels are not reallocated in this connection. A register of reserved codes can be maintained in the system to describe the state of the codes on the lowest level of the code tree. If, for example, one code is reserved for use on level SF=32, this shows in the register as 16 reserved codes on level SF=512.

In an embodiment, a calculation method to be described in the following can be used for finding a correct level of the code tree. Assume that a new user is a user of a relatively low rate and a spreading code on level SF=256 is allocated to the user, and that there are three allocated spreading codes on level SF=256. First, floor [(AT/VAR)] is calculated, wherein "floor" refers to rounding downwards to an integer, and "AT" refers to the number of spreading codes on the highest spreading code level used, i.e. on level 256 or 512. "VAR" describes the number of reserved spreading codes on the highest spreading code level used, i.e. on the lowest level of the code tree. The variable VAR, which describes the number of reserved codes, may contain not only the number of already reserved codes but also the new user as well. The variable VAR also takes the spreading codes reserved for control channels into account. For example, in a system wherein the control channels reserve spreading codes 0, 1 and 16, these spreading codes first reserve for use one branch on a high level of the code tree, i.e. in the variable VAR they appear as a FIG. 1. When the number of users increases, 0/1 and 16 will be located in different branches, appearing as a FIG. 2 in the variable VAR. The variable VAR can thus be used in many different ways, also in such a manner, for example, that VAR is always number of users+ new user only.

It is assumed in the example that the form VAR+2 is used in the formula, floor[(AT/(VAR+2)] thus being floor[256/ (3+2)], which gives 51 as the division result. Next, a level list is used, which includes the number of spreading codes of an allocation level as divided downwards in powers of two. The extents of the level ranges in the level list are thus the following: [2 3], [4 7], [8 15], [16 31], [32 63], [64 127] and [128 256], i.e. the extent of the first range is two, the extent of the next range is four, etc. Now, the division result 51 calculated in the example belongs to range [32 63]. Finally, the spreading factor of the allocation level is divided by the minimum of the range, i.e. 256/32, which gives 8. The selection of the new spreading code has thus resulted in finding level SF=8 of the code tree, which includes a branch below which no spreading code is allocated for use. If, on account of the settings of the variable VAR, for example, no free branch can be found on the found level, the process moves to the next level downwards the tree, and a free branch is selected from this level and a code subordinate to the branch is allocated for use.

Figure 2:
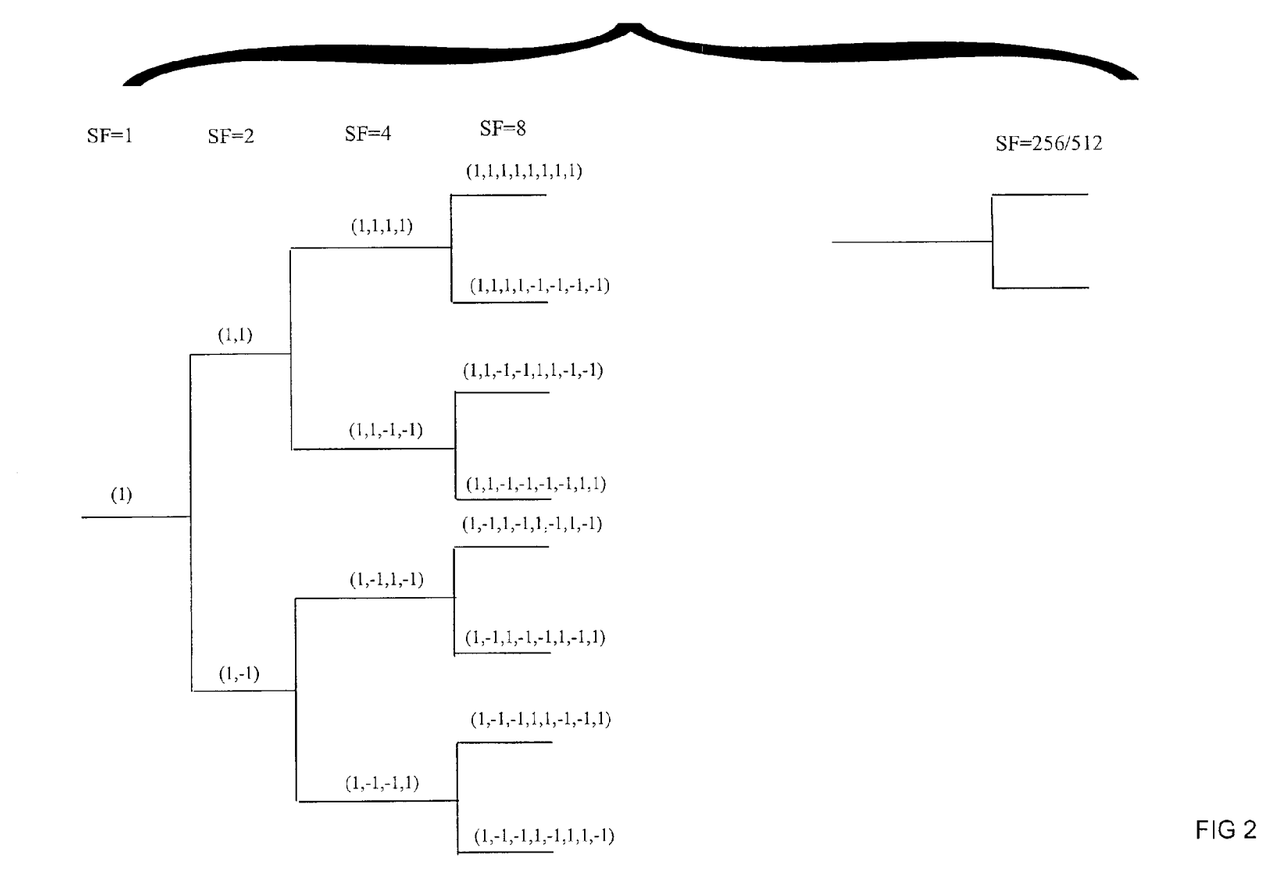
FIG. 2 illustrates a partial structure and a generation mechanism of a spreading code tree.

In practice, spreading codes are usually allocated to users from levels SF=256/512 but, for the sake of simplicity, an example will be shown in the following with reference to FIG. 2 wherein it is assumed that the users are high-rate users to whom spreading codes are allocated from level SF=8. If the first spreading code (1,1,1,1,1,1,1,1) is designated by an index 0, level SF=8 includes spreading codes 0 to 7. Assume that from among these spreading codes, spreading codes 0 and 3 are in use. In method step 102, the process starts traversing the tree from top to bottom, i.e. in practice from level SF=2 downwards since it is impossible to achieve separation on level SF=1. The method step includes checking whether or not level SF=2 includes branches whose spreading codes are not in use. This is to say that the branch per se is not allocated for use as a spreading code, and no spreading code generated from the particular branch in the code tree is allocated for use either. On level SF=2, branch (1,1) is reserved since spreading codes 0 and 3 subordinate to the branch on level SF=4 are allocated for use. However, branch (1,-1) on level SF=2 is allocatable, so the spreading codes subordinate to the particular branch can be allocated for use. Method step 104 includes selecting a free branch from the found level, i.e. level SF=2, for instance randomly. The branch to be used can be e.g. the first free branch on the sought level. In the present example, however, the only branch that can be selected is branch (1,-1). Method step 106 includes selecting a spreading code for use from level SF=8. The spreading code can be selected from among free spreading codes 4 to 7 for instance randomly. In addition to random selection, spreading codes can be selected in a similar manner to that used above in connection with selecting a free branch, i.e. the first free spreading code of the selected branch, for example, is selected to be the spreading code, or the spreading code is selected randomly or spreading codes are put to use from below a branch in a regular order e.g. by selecting every second spreading code. The spreading codes selected for use in the above-described manner are maximally different already as early as possible when the spreading code symbols are read from the beginning of the spreading code, in which case the spreading code to be allocated to the user is at the receiver as different as possible as compared with the other codes being used. If, for example, a spreading code 5 is allocated to a new user after users 0 and 3 in the system, the new spreading code differs from the ones being used already at the second spreading code symbol.

Figure 3:
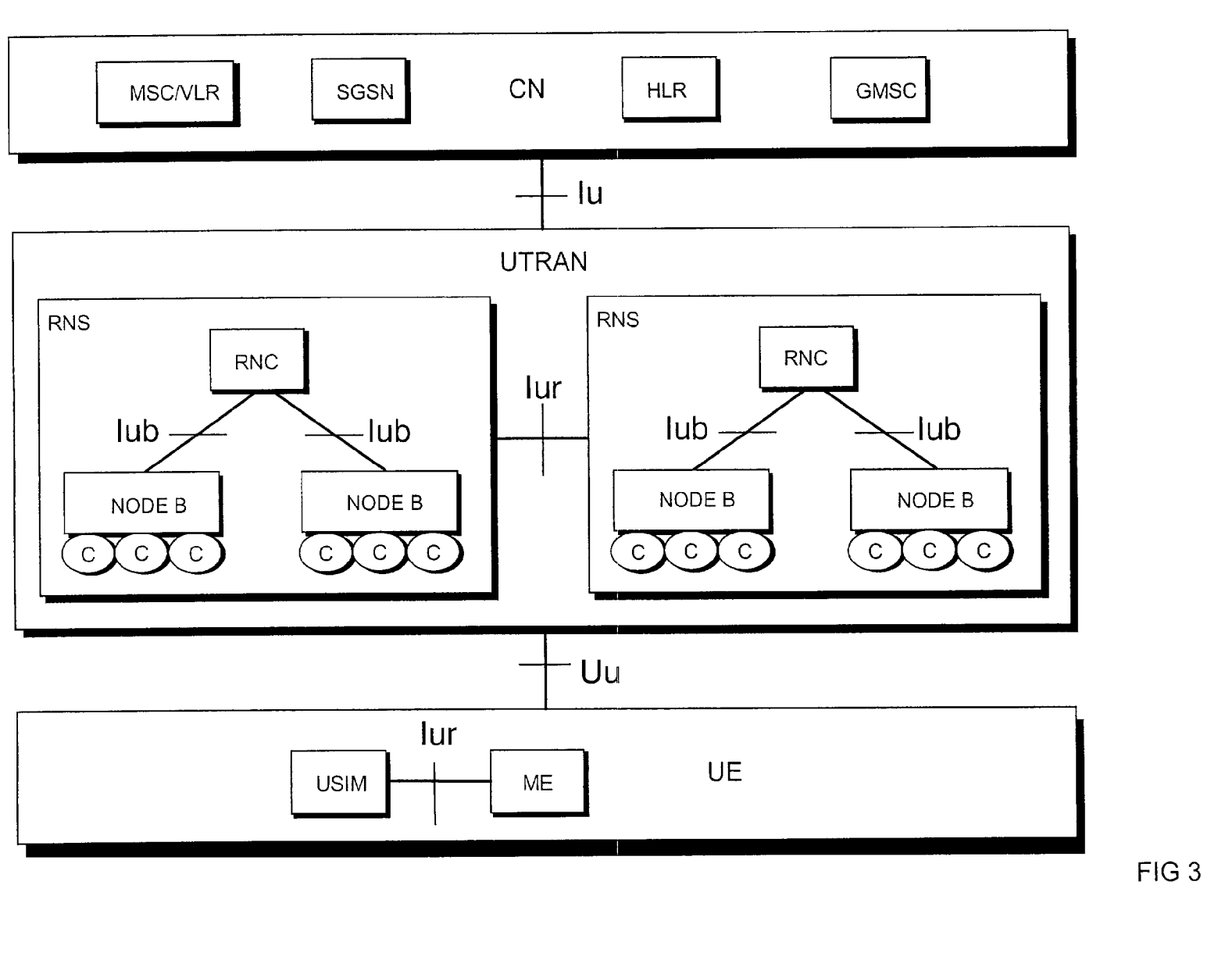
FIG. 3 is a structural diagram showing a UMTS mobile telephone system.

Next, the invention will be described by means of the structures of a mobile communication system and a transmitter. The description of the mobile communication system is based on a universal mobile communication system UMTS to be used as an example, but other systems using a code division multiple access method also constitute systems that are in accordance with the invention. The invention is not restricted to a duplex method used in the mobile communication system either but systems using both a time division duplex (TDD) method and a frequency division duplex (FDD) method constitute communication systems that are in accordance with the invention. In the TDD, the uplink and the downlink are separated in the same frequency band in terms of time whereas in the FDD, the transmission directions are implemented in different frequency bands. FIG. 3 shows the structure of a UMTS mobile telephone system on a general level. The figure only shows blocks that are essential for describing the invention, but it is obvious to one skilled in the art that a conventional mobile telephone system also includes other functions and structures that need not be explained in greater detail herein. The main parts of the system are a core network (CN), a UMTS terrestrial radio access network (UTRAN), and user equipment (UE). The interface between the CN and the UTRAN is called Iu, and the air interface between the UTRAN and the UE is called Uu. The functionality relating to a radio connection towards the UE is carried out in the UTRAN. The CN, in turn, is responsible for routing and connections to systems external to the UMTS network, such as a public switched telephony network (PSTN) and the Internet.

The UE includes two parts: mobile equipment ME, which operates as a radio terminal and is responsible for communication over the Uu interface, and a UMTS subscriber identity module (USIM), which is a smart card containing necessary information for user identification and authentication. The UTRAN includes one or more radio network subsystems (RNS), each of which includes one or more radio network controllers (RNC) and nodes B, i.e. base transceiver stations, whose coverage areas, i.e. cells, are designated by C in FIG. 3. The most important task of node B is to be responsible for the air interface towards the UE and the related processing, such as channel coding, interleaving, power control and user signal spreading. The RNC, which controls node B, is responsible for controlling the radio resources of the UTRAN and the loading situation of the cells belonging to the RNC and e.g. the functionality relating to allocation of new spreading codes in the cells. Among other things, the core network CN includes a gateway MSC (GMSC) which provides an interface to external networks, a home location register (HLR), a mobile services switching center (MSC) which provides the routing functionality, a visitor location register (VLR) and a serving GPRS (general packet radio service) support node (SGSN) which provides routing services for packet-switched connections.

The structure of the radio interface Uu is a three-layer protocol stack whose layers are: a physical layer L1, a data link layer L2 and a network layer L3. Layer L2 is further divided-into two sublayers: a radio link control (RLC) and a medium access control (MAC). Network layer L3 and a LAC are further divided into control (C) and user (U) levels. Physical layer L1 provides transport channels, the MAC and higher layers with information transfer services. L2/MAC layer, in turn, delivers information between the physical channels and logical channels located higher in the protocol stack.

The logical channels can be divided into control channels and traffic channels, according to their operation. The control channels in the UTRAN include the following: a broadcast control channel (BCCH), which is used on the downlink for transmitting system control information to terminal equipment; a paging control channel (PCCH), which is used for transmitting paging information in a cell for locating terminal equipment; a dedicated control channel (DCCH), which is a bidirectional channel used for transmitting control information between terminal equipment and a network; a common control channel (CCCH), which is a bidirectional channel used for transmitting control information between terminal equipment and a network and which is always linked to random access channels (RACH) related to call setup, and a forward access channel (FACH). The traffic channels include: a dedicated traffic channel (DTCH), which is a bidirectional traffic channel dedicated to one terminal for transfer of user information, and a common traffic channel (CTCH), which is a point-to-multipoint for transmitting traffic information to one or more terminals simultaneously. As to transmission channels, it can be stated by way of example that the logical broadcast control channel BCCH, for example, is implemented by a transmission channel BCH, the logical traffic channel DTCH is implemented by a transmission channel DCH, and the logical control channel PCCH is implemented by a transmission channel PCH.

On the physical protocol layer L1, the transmission channels are further implemented by physical channels. The DTCH, for instance, is implemented on a physical level called Downlink DPCH (Downlink Dedicated Physical Channel). The spreading codes used on the downlink vary between 4 and 512; the use of the spreading code 512, however, involves some limitations. Modulation causes changes to the transmission rates on the uplink and the downlink. On the uplink, the modulation method used is a method called BPSK while on the downlink, the modulation method used is a method called QPSK. The frame and burst structures used on the physical channels differ from each other, depending on the channel the transmission takes place. On the channel Downlink DPCH, for-instance, a 10 ms transmission-frame includes 15 time slots, the length of each time slot thus being 0.667 ms. A data packet to be transmitted in a time slot is called a burst, which includes 2560 chips. Typically, chips 0 to 1103 of a burst contain data, chips 1104 to 1359 contain a training sequence, chips 1360 to 2463 contains data again, and the end of the burst contains a 96-chip-long guard period. The training sequence is a set of symbols known both to the transmitter and the receiver, which enables the receiver to conclude the distortion caused to the information by the transmission path and, if necessary, to correct the information by means of the distortion information. A training sequence used on the uplink channel is usually longer in order to make the bursts supplied to a base transceiver station by different users easier to separate.

Figure 4:
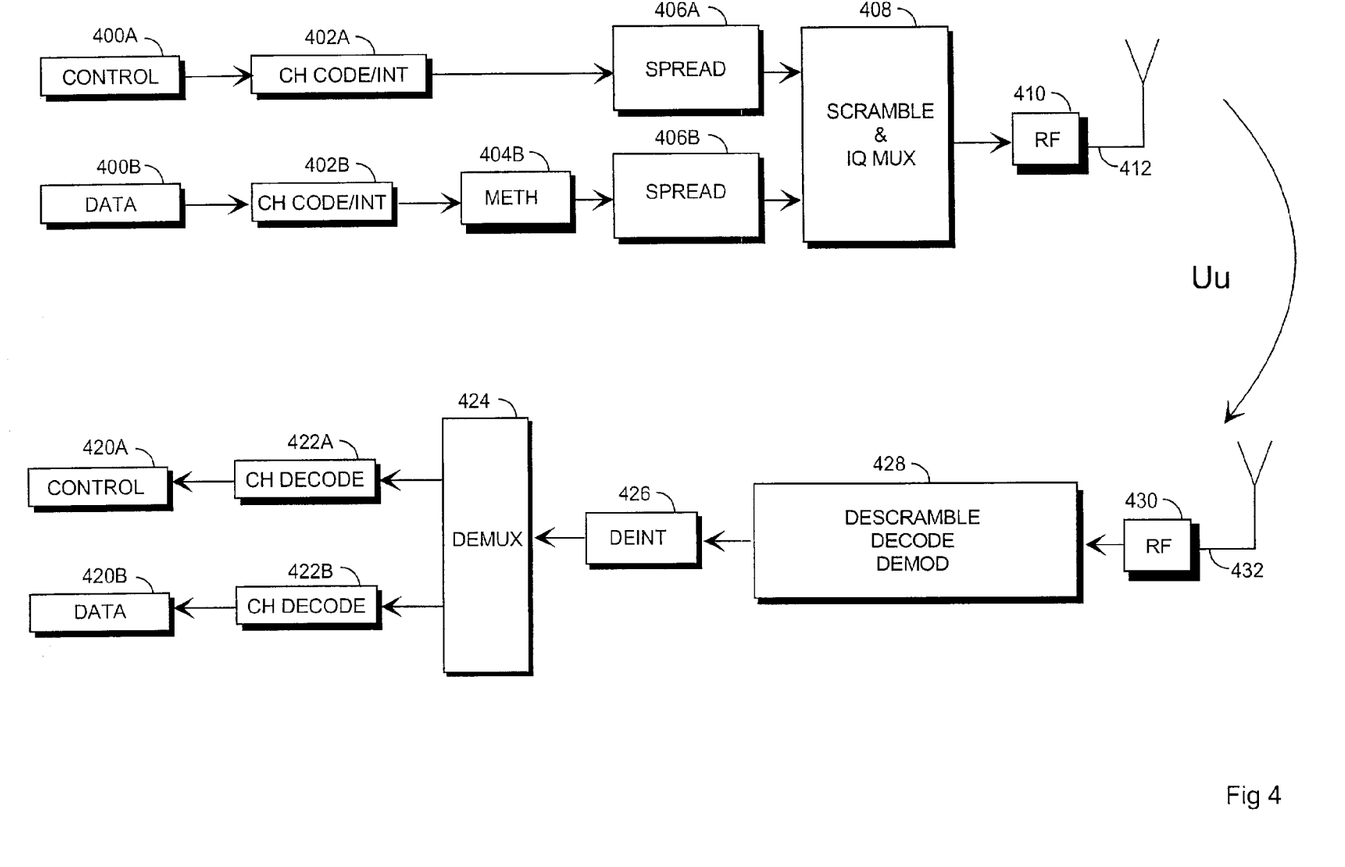
FIG. 4 shows an embodiment of the invention.

In the following, the stages that relate to transmitting information to the physical channels of a radio path by means of transmitter-receiver technology will be described in connection with FIGS. 4 and 5. FIG. 4 describes the operation of a radio transmitter/radio receiver pair on a general level. According to an embodiment of the invention, the radio transmitter is located at a base transceiver B and the radio receiver is located at a subscriber terminal UL. The upper part of FIG. 4 describes the essential functions of the radio transmitter such that the upper section shows the way in which a control channel procedure proceeds while the lower section shows the way in which a traffic channel procedure proceeds before the channels are combined and transmitted to the physical channel of the radio connection. Various information 400B to be supplied to the traffic channel includes e.g. speech, data, moving or still video image and control channels of the system. The control channel is provided with control information 400A, such as system information, which in connection with e.g. a pilot channel includes pilot bits which constitute a training sequence and which are used for channel estimation by the receiver. Different channels are thus subjected to different channel coding in blocks 402A and 402B, such as block coding or convolution coding and various modifications thereof, e.g. punctured convolution coding or turbo coding. The pilot bits, however, are not channel encoded since the aim is to find out the distortions caused to the signal by the channel. After the different channels have been channel encoded, they are interleaved at an interleaver 402A, 402B. The purpose of interleaving is to alleviate error correction, and in interleaving, the bits of different services are scrambled with each other in a certain manner, in which case a temporary fade on the radio path does not necessarily make the transmitted information unrecognisable. The interleaved bits of the control channel are spread in block 406A and the bits of the traffic channel in block 406B by spreading codes. The control channels and the traffic channels share the same code tree resources e.g. in a certain sector of the base transceiver station. The spreading codes of the control channels are, however, fixed in the system such that spreading codes are allocated to the control channels from level SF=256, and the spreading codes with indexes 0, 1 and 16 are allocated to the use of the control channels. Thus, on level SF=8 in the code tree shown in FIG. 2, this means that branch 0 is reserved by default and e.g. on level SF=16, branches 0 and 1 are reserved by default since they are in a control channel use. In FIG. 4, block 404B describes the device parts implementing the method of the invention, i.e. means for maintaining a code tree and means for selecting a spreading code for a user. The method steps are implemented at the transmitted e.g. by software, separate logic components or as ASIC (Application Specific Integrated Circuit). After the spreading, the chips are scrambled by a base-station-specific scrambling code and modulated in block 408, whose operation will be described in closer detail in FIG. 5. The separate signals obtained from different channels are combined in block 408 to be transmitted via the same transmitter. Finally, the combined signal is supplied to radio frequency parts 410, which may include different power amplifiers and filters to restrict bandwidth. The closed loop control used in transmission power control controls a transmission power control amplifier, which is usually located in this block. The analogue radio signal is transmitted to the radio path Uu via an antenna 412.

The lower part of FIG. 4 describes the essential functions of the radio receiver. A radio receiver is typically a RAKE receiver. The analogue, radio frequency signal is received from the radio path Uu by an antenna 432. The signal is supplied to radio frequency parts 430, which include a filter to block frequencies outside a desired frequency band. Next, in block 428, the signal is converted to an intermediate frequency or directly to baseband, in which form the signal is sampled and quantized. Since the signal is a multipath-propagated signal, the signal components propagated via different paths are to be combined in block 428, which includes the actual RAKE fingers of the receiver. User information is despread from the combination signal by multiplying the combination signal by the spreading code of the user. The data received in the physical channel is deinterleaved at a deinterleaver 426 and the deinterleaved physical channel is demultiplexed into the data flows of the different channels at a demultiplexer 424. Each channel is directed to a channel decoding block 422A, 422B of its own to be decoded into data flows 420A and 420B, respectively.

Figure 5:
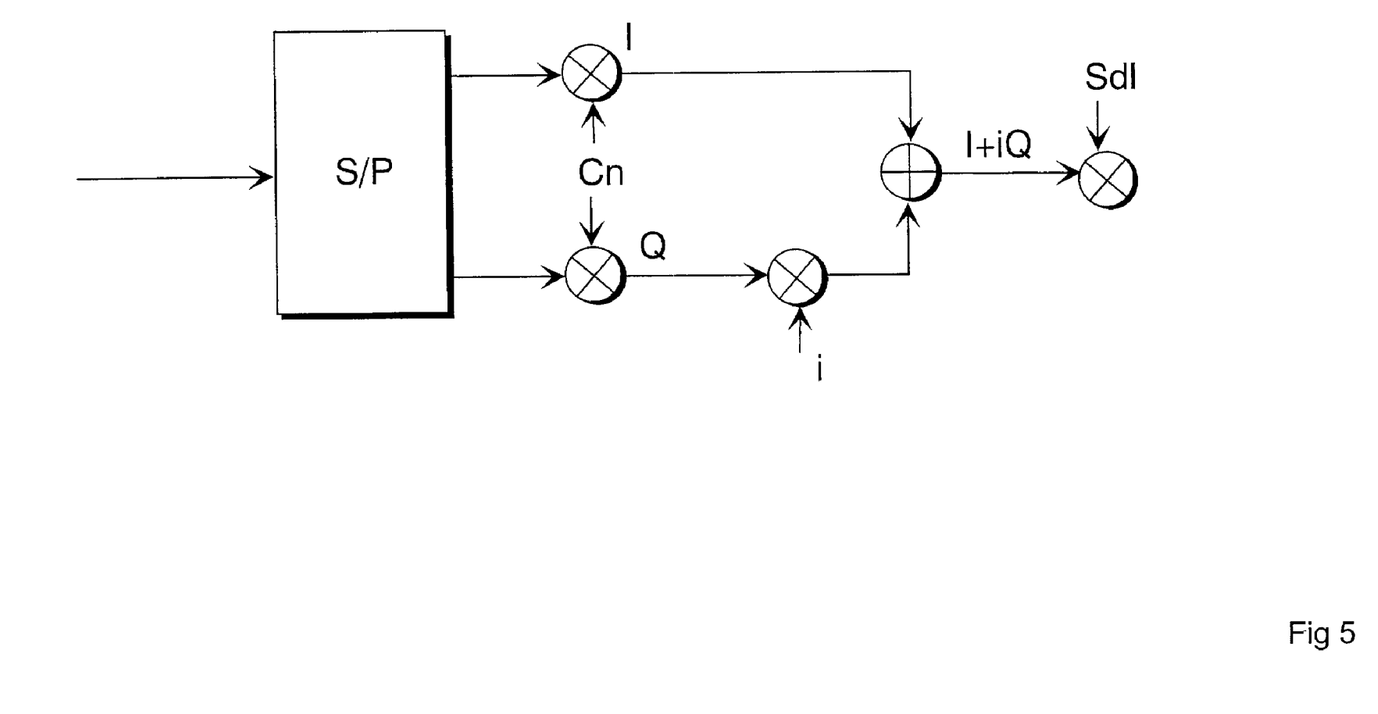
FIG. 5 shows an embodiment of a device in accordance with the invention.

FIG. 5 describes in closer detail how a control channel, e.g. a common pilot channel (CPICH), is spread by a spreading code and modulated for one user. In the figure, the bit flow of the channel is supplied to block S/P from the left; in block S/P, each two-bit sequence is converted from a serial form into a parallel form, i.e. one bit is supplied to an I branch of the signal while the other is supplied to a Q branch of the signal. The I and Q branches of the signal are then multiplied by the spreading code of the particular channel, whereby the relatively narrowband information is spread to a wide frequency band. The Q branch is subjected to a complex conversion, after which the branches are summed up. Next, the data carried on the channel is multiplied by the scrambling code of the base transceiver station.

Although the invention has been described above with reference to the example according to the accompanying drawings, it is obvious that the invention is not restricted thereto but can be modified in many ways within the scope of the inventive idea disclosed in the attached claims.

The invention claimed is:

1. A method for selecting a spreading code in a spread spectrum system, wherein spreading codes are selected for allocation to terminals from a code tree which includes hierarchical levels, in which code tree spreading codes according to a certain spreading factor are located on the same level, the levels being arranged such that the level of the lowest spreading factor is located highest in the tree and the rest of the levels are located below the highest level in an order according to the spreading factor, from the lowest to the highest, the method comprising:
    searching the code tree for a highest level of the code tree which includes at least one branch of the code tree, wherein spreading codes in hierarchical relation to the branch are allocatable, the branch being selected such that spreading code symbols characterizing the branch differ from the symbols of reserved spreading codes as early as possible when the symbols are read from the beginning of the spreading code, and
    allocating for use a spreading code related to the branch of the sought level.

2. The method of claim 1, wherein for searching the level, information is used about a spreading factor of the spreading code level to be allocated to the terminals, and information is used about the number of reserved spreading codes located on the spreading code level.

3. The method of claim 1, wherein when searching for the level of the code tree, the code tree is traversed level by level from top to bottom until a branch is found and spreading codes in hierarchical relation to the branch are allocatable.

4. The method of claim 1, wherein when selecting a spreading code for a high-rate user, the reserved spreading codes are reallocated, if necessary, in order to release the branch and the spreading codes in hierarchical relation to the branch located on the level of the code tree corresponding with the spreading factor of the high-rate user.

5. A method for selecting a spreading code in a spread spectrum system, wherein spreading codes are selected for allocation to terminals from a code tree which includes hierarchical levels in which code tree spreading codes according to a certain spreading factor are located on the same level, the levels being arranged such that the level of the lowest spreading factor is located highest in the tree and the rest of the levels are located below the highest level in an order according to the spreading factor, from the lowest to the highest, the method comprising:
  searching the code tree for a highest level of the code tree which includes at least one branch of the code tree, wherein spreading codes in hierarchical relation to the branch are allocatable the branch being selected such that spreading code symbols characterizing the branch differ from the symbols of reserved spreading codes as early as possible when the symbols are read from the beginning of the spreading code, and
  allocating for use a spreading code related to the branch of the sought level,
  wherein said searching the code tree comprises:
  calculating the division ratio of the total number of spreading codes located on the lowest level of the code tree to the reserved codes, and rounding the division ratio downwards to the nearest integer;
  placing the division result in a level range in a level list, the extent of the level ranges increasing in powers of two up to the number of spreading codes; and
  selecting a level of the code tree which has an appropriate spreading factor, which is calculated by dividing the total number of spreading codes by the minimum of the level range.

6. The method of claim 1, wherein in the spread spectrum system, the information between the terminals and a base transceiver station in the spread spectrum system is multiplied by a spreading code which includes symbols in order to spread the information over the frequency band used by the base transceiver station, the spreading code being selected from a code tree which is divided into branches such that higher level spreading codes in the code tree constitute two lower level spreading codes, in which the symbols of the first half of the lower level spreading codes are congruent with the symbols of the immediately higher level spreading code.

7. A communication system using a-code division multiple access, the system comprising:
  a base transceiver station and terminals communicating with the base transceiver station;
  means for maintaining a code tree which includes a hierarchically branching structure where a spreading code on a higher level of the code tree is related to two spreading codes on a lower level, symbols of the first half of the spreading codes on the lower level being congruent with those of the spreading code on the higher level; and
  means for selecting a spreading code from the code tree for the use of the terminals for transmission from the base transceiver station to the terminals,
  wherein the means for selecting a spreading code are configured to:
  search the code tree for a highest level which includes at least one branch of the code tree, spreading codes in subordinate relation to the branch being allocatable,
  select a spreading code from the code tree for the terminal such that the symbols of the spreading code differ from the symbols of the spreading codes selected for the use of other terminals as early as possible when the symbols of the spreading code are read from the beginning of the spreading code; and
  allocate a spreading code related to the branch of the sought level for the use of the terminals.

8. A communication system using code division multiple access, the system comprising:
  a base transceiver station and terminals communicating with the base transceiver station;
  means for maintaining a code tree which includes a hierarchically branching structure where a spreading code on a higher level of the code tree is related to two spreading codes on a lower level, symbols of the first half of the spreading codes on the lower level being congruent with those of the spreading code on the higher level; and
  means for selecting a spreading code from the code tree for the use of the terminals for transmission from the base transceiver station to the terminals,
  wherein the means for selecting a spreading code are configured to:
  search the code tree for a highest level which includes at least one branch of the code tree, spreading codes in subordinate relation to the branch being allocatable, and
  allocate a spreading code related to the branch of the sought level for the use of the terminals,
  wherein, when searching the level of the code tree, the means for selecting a spreading code are configured to:
  calculate a provisional result by means of the total number of spreading codes located on the lowest level and the number of reserved spreading codes;
  place the provisional result in a level range in a level list, in which the total number of spreading codes is divided into at least two levels ranges, and
  select a level of the code tree which has an appropriate spreading factor, which is calculated by means of the total number of spreading codes and the minimum of the level range.

9. A base transceiver station in a CDMA mobile telephone system, comprising:
  means for maintaining a code tree which determines spreading codes to be used in the system, in which code tree spreading codes according to a certain spreading factor are located on the same level, the levels being arranged such that the level of the lowest spreading factor is located highest in the tree and the rest of the levels are located below the highest level in an order according to the spreading factor, from the lowest to the highest;
  means for selecting a spreading code from the code tree for the communication between the base transceiver station and terminals communicating with the base transceiver station,
  wherein the means for selecting a spreading code are configured to:
  select a highest level in the code tree which includes at least one branch of the code tree whose spreading codes are allocatable, the branch being selected such that spreading code symbols characterizing the branch differ from the spreading code symbols of the branches being used as early as possible when the symbols are read from the beginning of the spreading code, and allocate for use a spreading code generated from a branch of the selected level whose spreading codes are allocatable.

10. The base transceiver station of claim 9, wherein for selecting the level, the means for selecting a spreading code are configured to use information about a spreading factor of the spreading code level to be allocated to a user, and information about the number of users on the spreading code level.

11. An apparatus for selecting spreading codes, configured to:

maintain a code tree which includes hierarchical levels, in which code tree spreading codes according to a certain spreading factor are located on the same level, the levels being arranged such that the level of the lowest spreading factor is located highest in the tree and the rest of the levels are located below the highest level in an order according to the spreading factor, from the lowest to the highest, search the code tree for a highest level of the code tree which includes at least one branch of the code tree, spreading codes in hierarchical relation to the branch being allocatable with spreading code from the code tree for a terminal such that the symbols of the spreading code differ from the symbols of the spreading codes selected for the use of other terminals as early as possible when the symbols of the spreading code are read from the beginning of the spreading code, and allocate for use a spreading code related to the branch of the sought level.

12. The apparatus of claim 11, further configured to utilize information about a spreading factor of the spreading code level to be allocated to the terminal, and information about the number of reserved spreading codes located on the spreading code level.

13. The apparatus of claim 11, further configured to traverse the code tree level by level from top to bottom until a branch is found and spreading codes in hierarchical relation to the branch are allocatable.

14. The apparatus of claim 11, further configured to reallocate, if necessary, the reserved spreading codes when selecting a spreading code for a high-rate user, in order to release the branch and the spreading codes in hierarchical relation to the branch located on the level of the code tree corresponding with the spreading factor of the high-rate user.

15. An apparatus for selecting spreading codes, comprising:

means for maintaining a code tree which includes hierarchical levels, in which code tree spreading codes according to a certain spreading factor are located on the same level, the levels being arranged such that the level of the lowest spreading factor is located highest in the tree and the rest of the levels are located below the highest level in an order according to the spreading factor, from the lowest to the highest, means for searching the code tree for a highest level of the code tree which includes at least one branch of the code tree, spreading codes in hierarchical relation to the branch being allocatable with the symbols of the spreading code differ from the symbols of the spreading codes selected for the use of other terminals as early as possible when the symbols of the spreading code are read from the beginning of the spreading code, and means for allocating for use a spreading code related to the branch of the sought level.

16. The apparatus of claim 15, further comprising means for utilizing information about a spreading factor of the spreading code level to be allocated to the terminal, and information about the number of reserved spreading codes located on the spreading code level.

17. The apparatus of claim 15, further comprising means for traversing the code tree level by level from top to bottom until a branch is found and spreading codes in hierarchical relation to the branch are allocatable.

18. The apparatus of claim 15, further comprising means for reallocating the reserved spreading codes when selecting a spreading code for a high-rate user, in order to release the branch and the spreading codes in hierarchical relation to the branch located on the level of the code tree corresponding with the spreading factor of the high-rate user.

19. A method for selecting a spreading code in a spread spectrum system, the method comprising:

providing a code tree that includes hierarchical levels of spreading codes in which spreading codes relating to a particular spreading factor are located on an associated level;

arranging the hierarchical levels of spreading codes such that a level of a lowest spreading factor is located at a highest portion of the code tree and remaining levels of spreading codes are located subordinate to the highest portion in an order according to the lowest spreading factor to a highest spreading factor;

searching the code tree for a highest level of the code tree having at least one branch with at least one allocatable spreading code, the branch being selected such that spreading code symbols in the branch differ from symbols of previously reserved spreading codes as early as possible when the symbols are read from the beginning of the spreading code so as to maximize a difference between the selected branch and previously used branches; and allocating a spreading code related to the branch of the sought level for use.

20. A communication system using code division multiple access, the system comprising:

a base transceiver station under operative control of a controller; and terminals communicating with the base transceiver station;

wherein the controller comprises a code tree having a hierarchically branching structure, wherein a spreading code on a higher level of the code tree is related to two spreading codes on a lower level thereof, wherein symbols of a first half of the spreading codes on the lower level are congruent with corresponding segments of the spreading code on the higher level, wherein the controller is configured to search the code tree for a highest level which includes at least one branch of the code tree, wherein the controller selects a branch for use by the at least one terminal such that spreading code symbols in the selected branch differ from symbols of previously reserved spreading codes as early as possible when the symbols are read from the beginning of the spreading code so as to maximize a difference between the selected branch and previously used branches; and wherein the controller selects a spreading code from the selected branch and forwards the selected spreading code from the base transceiver station to the at least one terminal.

* * * * *